(No Model.) 4 Sheets—Sheet 1.

W. BEHAN & P. FRIENSEHNER.
FEED DEVICE FOR GIN SAW SHARPENERS.

No. 396,800. Patented Jan. 29, 1889.

WITNESSES:
Fred G. Dieterich
Edw. W. Byrn.

INVENTOR.
Wm Behan
Paul Friensehner
BY Munn & Co
ATTORNEY.

(No Model.) 4 Sheets—Sheet 2.

W. BEHAN & P. FRIENSEHNER.
FEED DEVICE FOR GIN SAW SHARPENERS.

No. 396,800. Patented Jan. 29, 1889.

WITNESSES: INVENTOR,
BY
ATTORNEY.

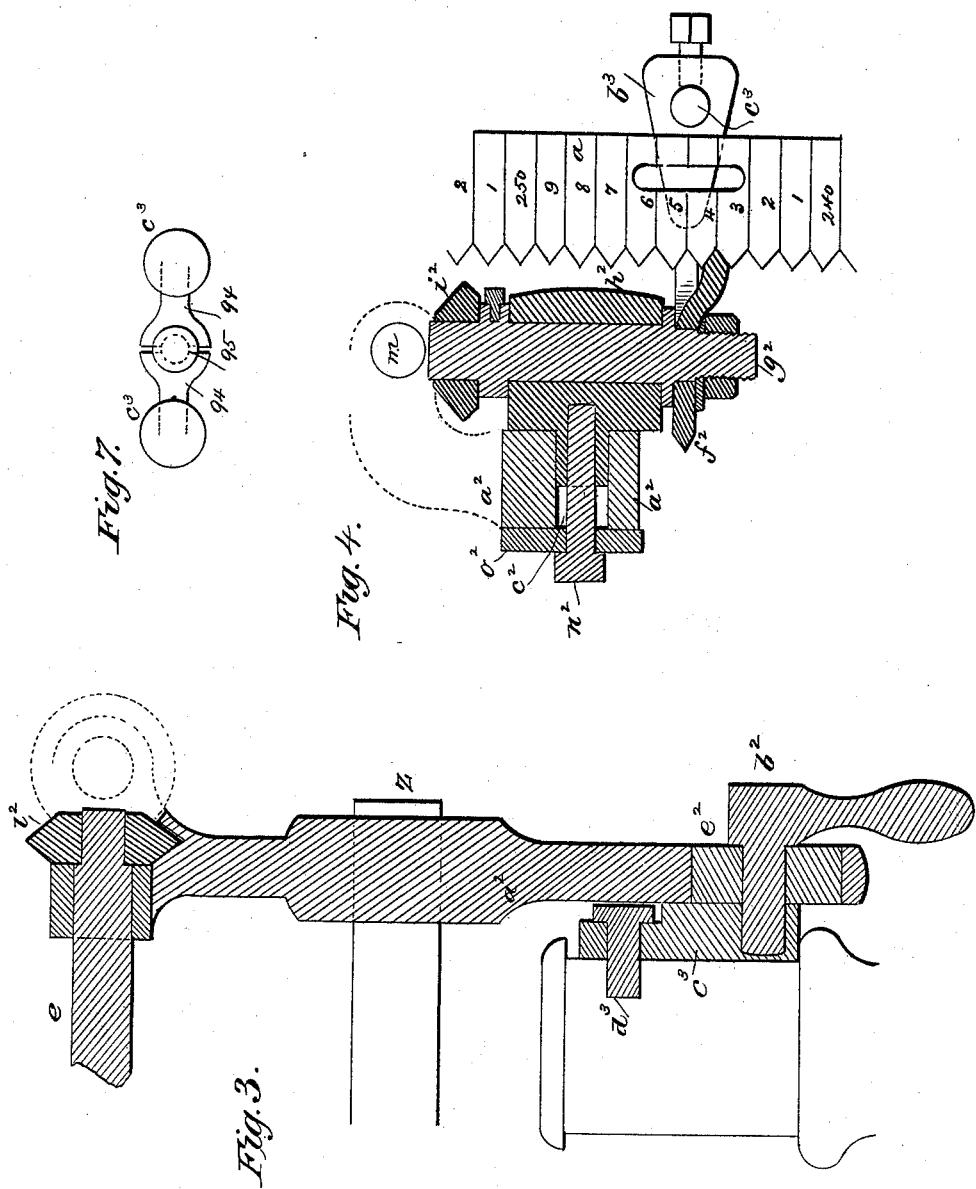

(No Model.) 4 Sheets—Sheet 4.

W. BEHAN & P. FRIENSEHNER.
FEED DEVICE FOR GIN SAW SHARPENERS.

No. 396,800. Patented Jan. 29, 1889.

WITNESSES:
Fred J. Dieterich
Edw. H. Byrn

INVENTOR,
Wm Behan
Paul Friensehner
BY Munn & Co
ATTORNEY.

N. PETERS, Photo-Lithographer, Washington, D. C.

UNITED STATES PATENT OFFICE.

WILLIAM BEHAN AND PAUL FRIENSEHNER, OF TEXARKANA, TEXAS.

FEED DEVICE FOR GIN-SAW SHARPENERS.

SPECIFICATION forming part of Letters Patent No. 396,800, dated January 29, 1889.

Application filed May 12, 1888. Serial No. 273,727. (No model.)

*To all whom it may concern:*

Be it known that we, WILLIAM BEHAN and PAUL FRIENSEHNER, of Texarkana, in the county of Bowie and State of Texas, have invented a new and useful Improvement in Feed Devices for Gin-Saw Sharpeners, of which the following is a specification.

In Patent No. 365,567, granted June 28, 1887, we have shown and described a machine for sharpening the teeth of a gang of gin-saws, and as the saw-filing devices operated upon each tooth the filing devices themselves effected the feed of the circular-saw disk so as to intermittently bring a new tooth under the action of the filing devices. There are some objections to this plan of feeding; and our present invention is designed to provide a feeding device for the teeth which is independent of the filing devices, and which shall be so constructed that it will properly feed the teeth of saws of varying diameters, so as to give a regular and uniform size to each tooth without reference to the number of teeth in the saw.

Our invention consists in the peculiar construction and arrangement of the various parts of the machine, which we will now proceed to describe with reference to the drawings, in which—

Figure 1:
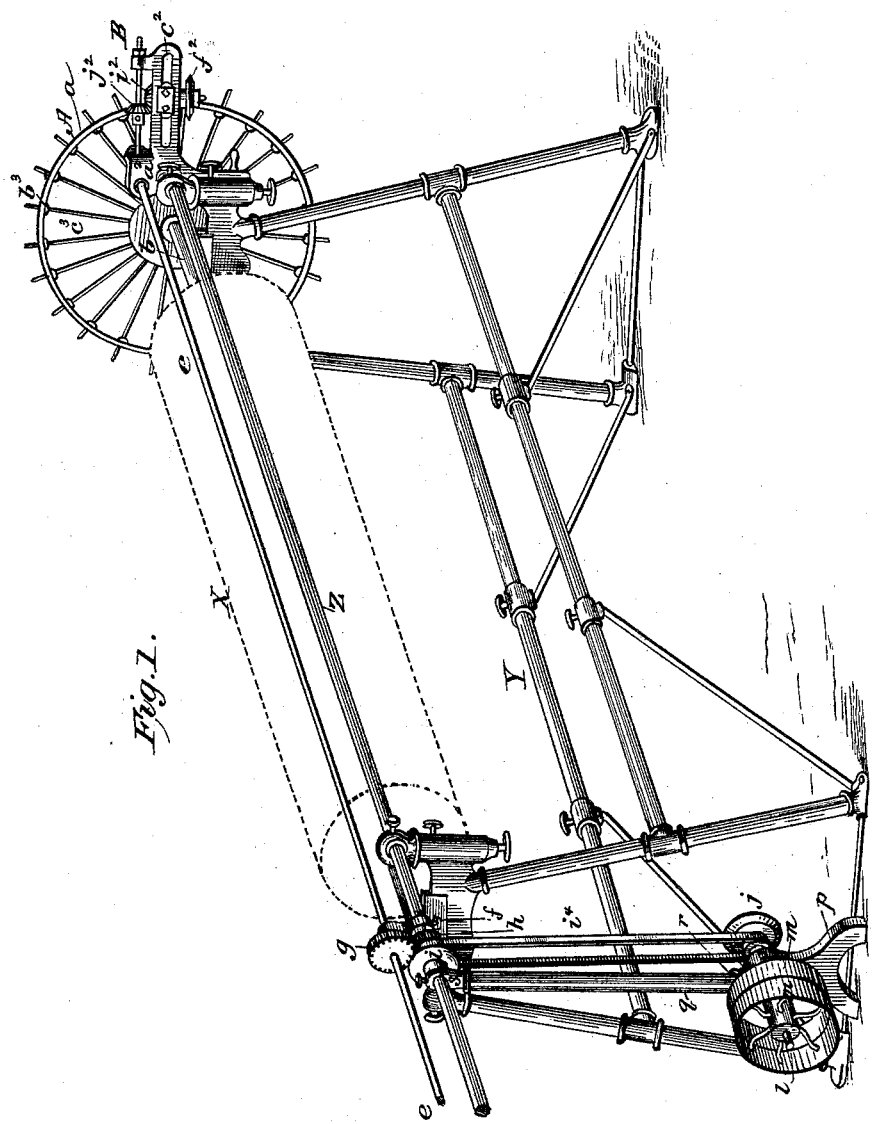
Figure 2:
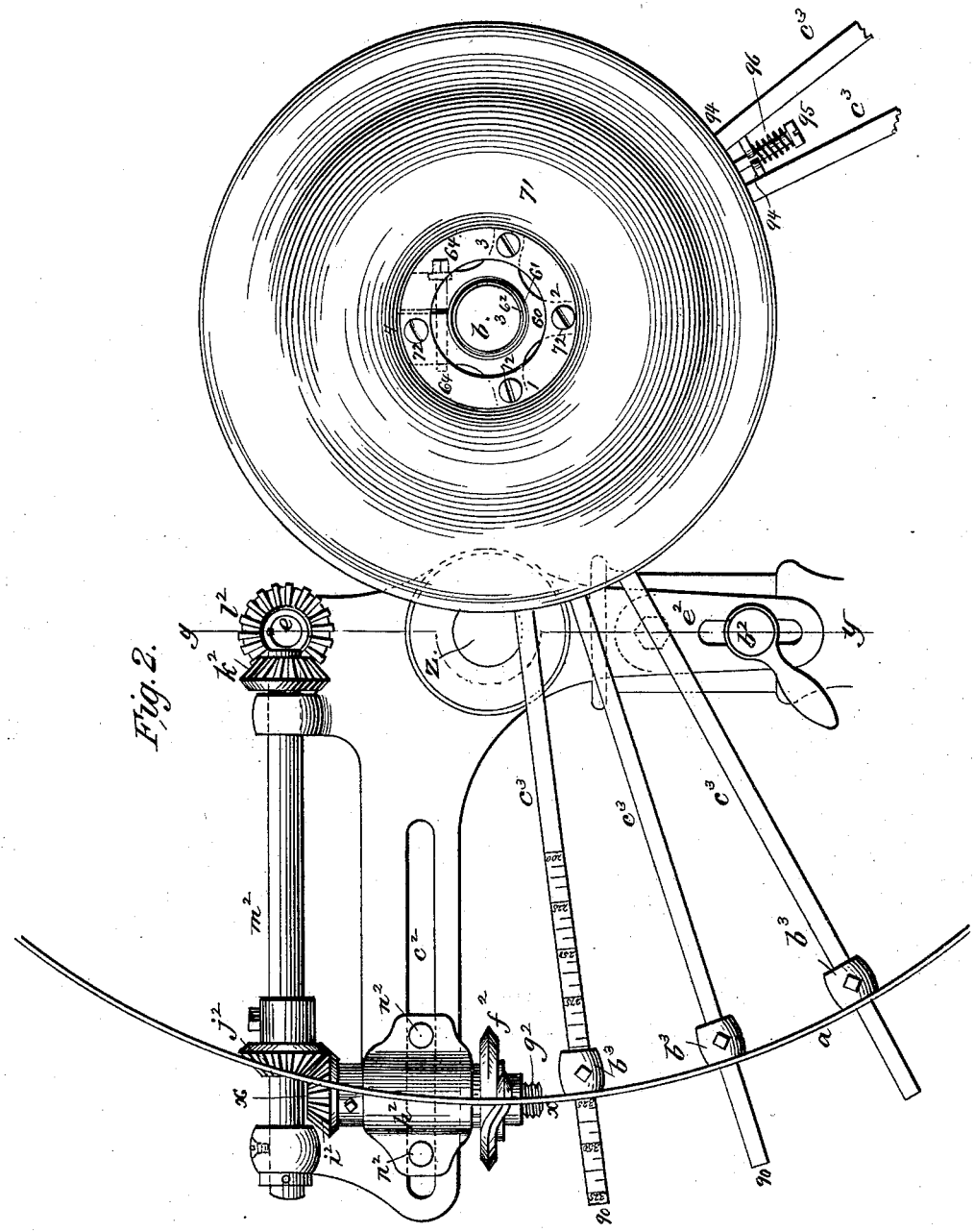
Figure 5:
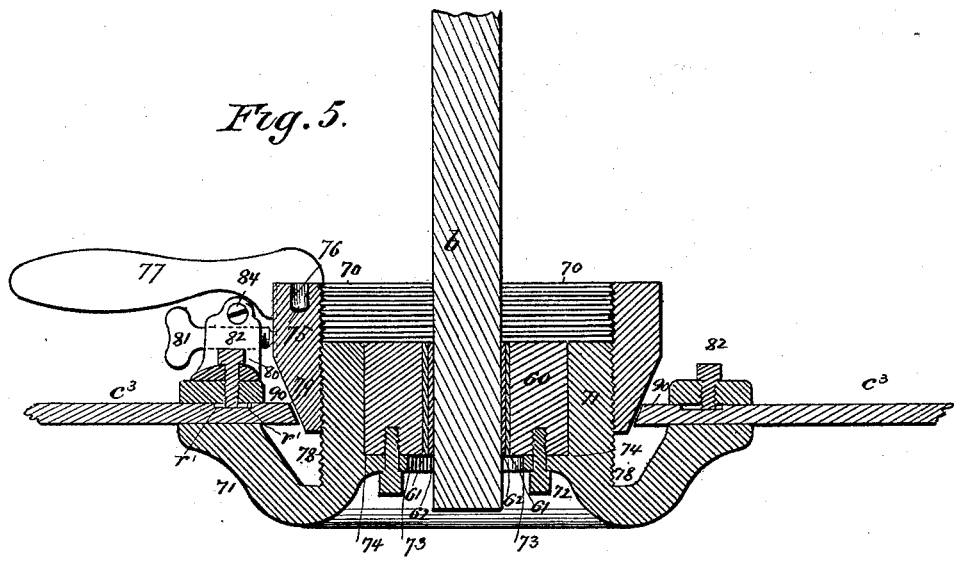
Figure 6:
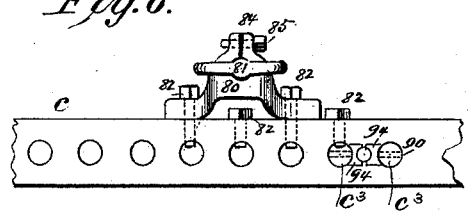

Figure 1 is a perspective view of the saw-filing-machine frame shown in our previous patent, Fig. 1, with our improved feed devices applied thereto. Fig. 2 is a view of the remote end of the machine, (shown in Fig. 1,) showing in side elevation the expanding wheel and operating-gears. Fig. 3 is a vertical section through the line $y\ y$ of Fig. 2. Fig. 4 is a vertical section through line $x\ x$ of Fig. 1. Fig. 5 is a central section through the hub of the expanding wheel; and Figs. 6 and 7 are detail views, hereinafter referred to.

Referring to Fig. 1, X is the series of gin-saws mounted on shaft $b$ and arranged to revolve in bearings in an adjustable frame, Y.

Z is a vertically-adjustable shaft, upon which is mounted and on which slides the gin-saw-filing devices, (which are not here shown,) all of which devices are, as so far described, substantially as shown in our prior patent, referred to.

At one end of the gin-saw shaft, and rigidly connected to it so as to turn the series of gin-saws, is an adjustable expanding wheel, A, which is acted upon by feed devices B to intermittently turn the gin-saws, tooth by tooth. These feed devices are driven by a shaft, $e$, placed horizontally above the shaft Z, and this same shaft $e$ is also utilized to drive the filing devices. (Not shown.) The shaft $e$ is held in position by an arm, $f$, and has near said arm a gear, $g$, meshing with a smaller gear, $h$, on shaft Z, which gear $h$ is rigidly attached to a cone-pulley, $i$, which revolves loosely upon shaft Z and is kept in place by collars. The cone-pulley $i$ is connected by belt $i^4$ to a cone-pulley, $j$, below, by which the speed of the entire machine can be regulated in accordance with the size of pulley of the main shaft or speed of engine.

The cone-pulley $j$ is secured to a shaft, $l$, onto which are also placed a tight and loose pulley, $m$ and $n$, that are belted to the pulley of a main drive-shaft. The shaft $l$ runs in a box, $o$, of a frame, $p$, the top of which is shaped so that an upright post, $q$, can be let into a bored hole therefor at $r$, with a set-screw for adjusting said post $q$ in the said seat. This adjustment is necessary when the shaft Z is raised or lowered, since the upright post $q$ connects with the said shaft Z in order to give a proper support thereto.

The connection of shaft Z and post $q$ is by a collar, $s$, the lower part of which is shaped so that the post fits into and is secured to it.

We will now proceed to describe the means whereby the shaft $e$ is made to impart a rotary step-by-step motion to the gin-saws to permit the teeth of the same to be successively filed. On the shaft $b$ of the gin-saws is rigidly fixed, by an adjustment hereinafter described, an expanding wheel, A, having a tire or rim, $a$. This rim is a flat band of steel which rests upon adjustable feet $b^3$, which slide on spokes $c^3$, and the ends of the rim $a$ are lapped and secured by slots in the rim and bolts or screws, so that said rim, which is elastic and flexible, may be made to describe a greater or less circumference by adjusting the feet $b^3$ in or out on the spokes by means of set-screws $b^4$. When this rim is set to its adjustment, all the spokes are forced outwardly by a central tightening device hereinafter described, whereby the rim is held rigidly on the feet $b^3$. One edge of this rim all the way around is provided with teeth, notches, projections, indentations, or other equally-spaced openings. (See Fig. 4.) Into these teeth or notches there meshes a worm-wheel, $f^2$. This wheel is not constructed with a regular spiral, but has only one portion of its periphery (about one-tenth part) set off from the plane of the rest to give the feed, in order that the feed may not be continuous, but may be intermittent, taking place only between the acts of filing each tooth. This worm-wheel is rigidly fixed to a short vertical shaft, $g^2$, which turns in a sliding block, $h^2$, and has a rigid bevel gear-wheel, $i^2$, on its upper end. This bevel-gear receives motion from a bevel-gear, $j^2$, on a horizontal shaft, $m^2$, at right angles to $g^2$, and this shaft in turn has a bevel-gear, $k^2$, that receives motion from a bevel-gear, $l^2$, on the shaft $e$. (Shown in Fig. 1.) It will thus be seen that rotary motion is through these gears transmitted to the feed or worm wheel $f^2$, to give an intermittent rotary motion to the expanding wheel A. This worm-wheel, it will be seen, always occupies a position in one of the notches of the expanding rim, and when not feeding it forward locks the rim solid, so that it cannot give to the strain of the filing devices on the saw-teeth, and there is no slack or loose play.

To support the shaft and gears just described, a frame, $a^2$, is provided, which (see Figs. 2 and 3) is made vertically adjustable on the main frame by a slot, $e^2$, and a clamping crank-screw, $b^2$, which enters a plate, $C^3$, hung upon bolt $d^3$.

In order to permit the gears to be adjusted to correspond with the different positions of the rim $a$ when adjusted to a larger or smaller circumference, the bevel-gear $j^2$ is made to slide loosely on shaft $m^2$, and is connected to it for rigid rotation by a set-screw which enters a longitudinal groove in the shaft $m^2$. A corresponding adjustment is given to the worm-wheel by having its bearing $h^2$ fitted with a tenon to slide in a slot, $c^2$, of frame $a^2$, the bearing being held in place and its adjustment fixed by set-screws $n^2$, as shown in Fig. 4.

We will now proceed to describe the means for connecting the expanding wheel A to the gin-saw shaft $b$ and the devices for expanding or distending the outer rim of said wheel to tighten it. (See Fig. 5.) The main frame or hub 71 of the wheel A is screw-threaded at 78, and on the same is screwed a collar, 70, which is threaded inside and is formed with a conical or tapering external surface. When this collar is screwed into the hub, its conical face bearing against the inner ends of the spokes $c^3$ forces them out evenly all at one time, thus expanding the rim of the wheel and tightening it, so that it works as a positive feed-wheel. This collar is turned by means of a handle, 77, Figs. 2 and 5, shaped to correspond with the outer circumference of said collar and adapted to be taken from the latter when not in use by means of a peg, 76, riveted to it and fitting in a socket, 75. After the spokes $c^3$ are expanded sufficiently the taper collar 70 is held from unscrewing by a binding-screw, 81, that runs through a frame, 80, (see Fig. 6,) the upper end of which is split at 84 and pinched together by screw 85. This affords an additional tightening for binding-screw 81, that holds said collar firm. The frame 80, Fig. 6, is secured to the main frame of the wheel by two of the spoke-screws 82, or otherwise. These spoke-screws bind against the spokes at a grooved or flattened place, $r'$ $r'$, Fig. 5, which holds the spokes to place and prevents them from turning.

Between each pair of spokes is arranged a spiral spring, 96, Figs. 2 and 7, which spring is disposed about a headed screw, 95, that is fastened radially in the hub of the wheel. This spring at one end bears against the head of the screw and at the other end against two fork-like projections, 94, attached to the spokes, and thus serves to force the spokes inwardly, or in the reverse direction to the adjustment given them by the tapering collar, and also serves to keep the spokes from turning.

We will now describe how the expanding wheel is centered upon the various gin-saw shafts. Within the hub 71 of the wheel is a clamp, 60, the inner bore of which is as large as the largest-sized shaft of gin-saws, while split-bushings 61 and 62 serve to adjust it to the smaller sizes of shaft. The clamp is so shaped that the outside periphery will fit the inner bore of the main frame or wheel-hub, which is slipped onto the clamp until its flange 73 bears against the face of the clamp to which it is secured by screws 72. This construction and arrangement provide a very simple, rapid, and accurate centering of the wheel without marring the gin-saw shaft.

In making use of our invention we first ascertain how many teeth a saw-disk has that we are to work on, no matter whether it is new or worn, large or small diameter. The number of teeth around the entire circumference is the same on each saw of a gang. Say the number of teeth is two hundred and seventy-five, we would then set our elastic band to 275, which would indicate two hundred and seventy-five divisions in the entire circumference. The band is then secured to the wheel, as previously described, the feed-disk adjusted to the band, the sliding gear to the feed-disk for rotation, and we are ready for work. With the band set for two hundred and seventy-five divisions we would work upon a saw-disk that has, or originally had, two hundred and seventy-five teeth, which may be regularly or irregularly spaced, or the teeth in part or all entirely broken out, or a naked disk. Our band set for 275 would furnish for the filing-machine two hundred and seventy-five equally-spaced divisions for two hundred and seventy-five teeth in one revolution without attention or mistake and without reference to the diameter or circumference of the saws. This adjusting expanding wheel A, therefore, is in the nature of a gear-wheel having a variable number of teeth on its periphery to adjust the number of feed movements in a single revolution to any standard that may be desired. This adjustable wheel with flexible expanding toothed rim is an important feature of our invention and may be used for a variety of analogous purposes.

The advantages which belong to its application for sharpening saws are lightness, great leverage which the wheel permits to be exerted, its function as a locking device for the saws while being filed, its accuracy, and its universal adaptation to gin-saws of any circumference and number of teeth.

Having thus described our invention, what we claim as new is—

1. An expanding feed-wheel having a flexible rim notched or provided with openings and made adjustable in the direction of its length, for the purpose of imparting a variable feed, substantially as shown and described.

2. An expanding feed-wheel consisting of a flexible rim notched or provided with openings and made adjustable in the direction of its length, in combination with a series of radial spokes sustaining said rim, and a central expanding hub for tightening said spokes and rim, substantially as shown and described.

3. An expanding feed-wheel, A, consisting of the combination of a flexible notched rim, $a$, radial spokes $c^3$, with feet $b^3$ for the rim made adjustable on the spokes, the hub-frame 71, carrying said spokes, and a conical or tapering collar, 70, arranged on the hub to bear against the spokes and adjust them outwardly, substantially as described.

4. The combination, with the expanding feed-wheel A, of the clamp 60, with tightening-screw 64, and the split-ring bushings 61 and 62 for centering the expanding wheel on shafts of different sizes, substantially as described.

5. The combination, with the hub 71 in the expanding wheel, and the conical collar 70, of the tightening-screw 81, the split clamping-frame 80 for said tightening-screw, and the tightening-screw 85 for the split clamping-frame, substantially as and for the purpose described.

6. The combination, with the adjustable screw-threaded conical collar 70, having socket 75, of the turning-handle 77, having pin 76, for turning said collar, substantially as shown and described.

7. The combination, with the spokes in the expanding wheel having forked projections 94, projecting toward each other, of the headed screw 95, secured to the hub of the wheel, and a spiral spring, 96, arranged upon the screw between its head and the forked projections of the spokes to force the latter in toward the center, substantially as shown and described.

8. The combination of the expanding feed-wheel A, having toothed rim $a$, the frame $a^2$, with slot $c^2$, the worm-wheel $f^2$, shaft $g^2$, bearing $h^2$, and gear $i^2$, made together adjustable in the slot of the frame $a^2$ to correspond with the size of the feed-wheel, the shaft $m^2$, having gear-wheel $j^2$ made adjustable thereon, and fixed gear-wheel $k^2$, and the shaft $e$, having gear-wheel $l^2$ and connected with the driving mechanism, as described.

9. The combination, with the main frame Y, and rotary shafts Z and $e$, having the variable feed devices at one end, of the bracket-arm $f$, gear $g$, arranged on shaft $e$, cone-pulley $i$ and gear $h$, arranged on shaft Z, vertically-adjustable post $q$, carrying shaft Z, band $i^4$, and cone-pulley $j$, with shaft and drive-pulleys, substantially as and for the purpose described.

WILLIAM BEHAN.
PAUL FRIENSEHNER.

Witnesses:
JEFFERSON D. SANDERSON,
EDWIN LAMBERT.